United States Patent
Cox et al.

(10) Patent No.: US 6,459,513 B1
(45) Date of Patent: Oct. 1, 2002

(54) HOLOGRAPHIC SHRINK WRAP ELEMENT AND METHOD FOR MANUFACTURE THEREOF

(75) Inventors: John E. Cox, Salem; Christopher C. Christuk, Newbury, both of MA (US); Jeffrey S. Gagnon, Seabrook, NH (US)

(73) Assignee: Foilmark, Inc., Newburyport, MA (US)

( * ) Notice: Subject to any disclaimer, the term of this patent is extended or adjusted under 35 U.S.C. 154(b) by 0 days.

(21) Appl. No.: 09/707,878

(22) Filed: Nov. 7, 2000

Related U.S. Application Data

(62) Division of application No. 09/074,727, filed on May 7, 1998, now Pat. No. 6,181,446.

(51) Int. Cl.[7] .................................................. G03H 1/00
(52) U.S. Cl. .......................................... 359/1; 428/913
(58) Field of Search ................................ 359/1, 2, 3, 8; 428/913, 915

(56) References Cited

U.S. PATENT DOCUMENTS

| | | |
|---|---|---|
| 4,215,170 A | 7/1980 | Vilaprinyo |
| 4,259,285 A | 3/1981 | Baumgartl et al. |
| 4,913,858 A | 4/1990 | Miekka et al. |
| 5,003,915 A | 4/1991 | D'Amato et al. |
| 5,083,850 A | 1/1992 | Malik et al. |
| 5,155,604 A | 10/1992 | Miekka et al. |
| 5,164,227 A | 11/1992 | Miekka et al. |
| 5,182,069 A | 1/1993 | Wick |
| 5,383,687 A | 1/1995 | Suess et al. |
| 5,458,713 A * | 10/1995 | Ojster .......................... 428/915 |
| 5,503,792 A | 4/1996 | Kawamura et al. |
| 5,518,786 A | 5/1996 | Johnson et al. |
| 5,662,986 A | 9/1997 | Stepanek |
| 5,662,996 A | 9/1997 | Jourquin et al. |
| 5,797,492 A * | 8/1998 | Seki et al. ................... 428/913 |
| 5,851,615 A | 12/1998 | Kay |

FOREIGN PATENT DOCUMENTS

JP     09015421     * 1/1997

* cited by examiner

*Primary Examiner*—Cassandra Spyrou
*Assistant Examiner*—Euncha Cherry
(74) *Attorney, Agent, or Firm*—Kenyon & Kenyon

(57) ABSTRACT

A holographic shrink wrap element containing a shrink wrap film and a layer on the shrink wrap film, wherein the layer contains a holographic image. A process for preparing a holographic shrink wrap element includes providing, in the following order, a holographic polymer film having a holographic surface, a layer on the holographic surface and a shrink wrap film, and removing the holographic polymer film, leaving the holographic image on the layer.

5 Claims, 7 Drawing Sheets

HOLOGRAPHIC SHRINK WRAP ELEMENT AND METHOD FOR MANUFACTURE THEREOF

CROSS REFERENCE TO RELATED APPLICATION

The application is a divisional of application Ser. No. 09/074,727. Filed May 7, 1998 now U.S. Pat. No. 6,181,446.

FIELD OF THE INVENTION

The present invention is a holographic shrink wrap element containing a shrink wrap film (also known as "heat shrink film" or "shrink film") and a layer containing a holographic image and a process for the preparation thereof. Applications for such elements include compact disc (CD) package overwraps, bottle wraps such as aluminum beverage can coverings and package labels (especially food packaging). An additional application of the invention is use of the holographic shrink wrap element for sealing bands used in tamper evident applications.

BACKGROUND OF THE INVENTION

Shrink wrap films have seen a wide variety of applications such as CD overwraps, bottle wraps, beverage container wrappings, labels for packaging, especially food packaging, and sealing bands used in tamper evident applications. In an increasingly competitive marketplace, shrink wrap films are being called upon to provide more functionality including packaging design and security, primarily due to the difficulty in forging holograms. Heretofore, shrink wrap films have not been available with holographic patterns which are able to provide strong eye appeal and security simultaneously.

For example, materials are typically rendered holographic via microembossing at elevated temperatures and pressures. As set forth in U.S. Pat. Nos. 4,913,858; 5,164,227; 5,503,792; 5,155,604; and 5,662,986; substrates are rendered holographic under high heat and pressure. Because shrink wrap films are engineered to shrink under heat, it is not possible to emboss such films using traditional techniques.

Further, it is known that films can be imparted with a microembossed structure during an extrusion process. For example, U.S. Pat. No. 5,003,915 teaches the method of creating a holographic image on sheet material via a casting process while U.S. Pat. Nos. 4,913,858; 5,164,221; and 5,155,604 teach an extrusion onto a paper substrate prior to hot embossing. Extrusion of shrink wrap film onto an embossing chill roller is further discussed in U.S. Pat. No. 5,182,069. The disadvantages of such routes include the need for capital equipment such as extruders and, in the latter case, the depth of embossing (up to two orders of magnitude deeper) which can be better described as macroembossing.

Rendering materials holographic via a transfer process is taught in U.S. Pat. Nos. 5,383,687 and 5,662,996. Both inventions therein utilize heat and pressure to achieve their ends and focus on aluminum metallized transfers. U.S. Pat. No. 5,383,687 describes hot stamping holographic foil onto sheets while U.S. Pat. No. 5,662,986 transfers a holographic image to a paper substrate under elevated temperatures and pressures. In both inventions, the heat required is well beyond the temperatures at which the shrink wrap film will begin to contract, rendering such approaches in the context of shrink wrap films inappropriate.

Heretofore, the art provides no means for producing holographic heat shrink elements wherein heat shrink film can be rendered holographic with the use of common coating/laminating equipment.

SUMMARY OF THE INVENTION

The present invention provides a holographic shrink wrap element containing a shrink wrap film and a layer containing a holographic image. The present invention is also directed to a process for the preparation thereof. The process of the present invention allows for the manufacture of full or selectively holographic web areas with clear, reflective, or high index coatings while imparting abrasion resistance and a high level of printability without activating the film's shrink qualities.

DETAILED DESCRIPTION OF THE INVENTION

Figure 1:
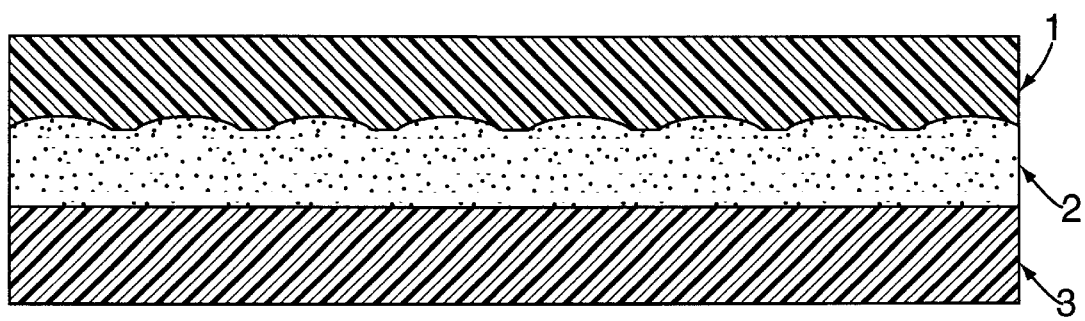
FIG. 1 is a cross sectional view of a holographic shrink wrap element of this invention containing a holographic polymer film 1/adhesive 2/shrink wrap film 3 prior to stripping the holographic polymer film. The adhesive shown in this figure can be either an electron beam coating or a cold laminating adhesive.

In a first embodiment (first embodiment), the holographic shrink wrap element of the present invention contains a shrink wrap film and a layer containing a holographic image. The layer containing the holographic image may be, where appropriate, an adhesive, an image intensifying layer or a release coating.

More specifically, in a second embodiment of the present invention (second embodiment), the holographic shrink wrap element contains a shrink wrap film and an adhesive, wherein the adhesive contains a holographic image.

In a third embodiment of the invention (third embodiment), the holographic shrink wrap element contains, in the following order, a shrink wrap film, an adhesive, and an image intensifying layer, wherein the image intensifying layer contains a holographic image.

In a fourth embodiment of the invention (fourth embodiment), the holographic shrink wrap element contains, in the following order, a shrink wrap film, an adhesive, and a release coating, wherein the release coating contains a holographic image.

The second, third and fourth embodiments are more specific embodiments of the first embodiment.

The shrink wrap film used in this invention is generally a commercially available non-holographic shrink wrap film such as REYNOLON® 5044 from Reynolds Shrink Films, DuPont CLYSAR® shrink film or GLS grade (polyolefin manufactured by UCB). Such films are typically high-clarity polyolefins or copolymers thereof Typical thicknesses range from 12.5 to 38 micron with a percent shrinkage between five and 70% but preferably between seven and 15%. Of these, the preferred shrink wrap film is GLS grade from UCB.

The adhesive which may typically be used in this invention includes an electron beam coating or a cold laminating adhesive. Such coatings are advantageous because they effect lamination and transfer without the application of heat. Typical electron beam curing coatings which may be used in the invention include ethylenically unsaturated monomers and oligomers such as acrylates. These may include, but are not limited to, urethane acrylates, polyester acrylates, and epoxy acrylates with single, double or multiple functionality. The cold laminating adhesives which may be used in this invention are typically pressure sensitive. These may be of either solvent or water-based chemistry and include, but are not limited to, acrylics, one or two part urethanes, polyesters, or rubber. Morton International manufactures a wide range of cold laminating adhesives such as MORSTIK® 227 (water-based pressure sensitive adhesive). Typical coating weights for the adhesive are in the range of 4–5 $g/m^2$.

The image intensifying layer may be any reflective or high index material. For example, the image intensifying layer may be at least one of the following: a vacuum vapor deposited aluminum; silicon monoxide; silicon dioxide; aluminum oxide; magnesium fluoride; zinc sulfide; titanium dioxide; tin tungsten oxide and indium tin oxide. Of these, the vacuum vapor deposited aluminum is preferred. Typical coating thicknesses for the image intensifying layer are 200–400 Å. The image intensifying layer is optionally present with the release coating.

Typical components for the release coating are the following: three parts methyl methacrylate polymer: one part nitrocellulose; one part methyl methacrylate polymer: one part nitrocellulose; nitrocellulose; methyl methacrylate polymer; cellulose acetate; saturated vinyl acetate/vinyl chloride terpolymer such as VYNS-3 (Union Carbide); or an amorphous saturated linear polyester such as DYNAPOL® S-1606 (a polyester made by Hüls). Of these, the saturated vinyl acetate/vinyl chloride terpolymer and amorphous saturated linear polyester are preferred. Typical coating weight for the release coating is between 30–40 $mg/m^2$.

If desired, a tie coat can be provided between the release coating and the adhesive or between the image intensifying layer and the adhesive. A preferred tie coat is a vinyl chloride/vinyl acetate terpolymer. Typical coating weight for the tie coat is between 30–40 $mg/m^2$.

Colorants and other conventional additives may be added where appropriate. For example, colorants which will not interfere with the electron beam curing process may be added to the release coating to impart color to the finished shrink wrap element. At 1–5% on a solids basis, organic or inorganic pigments such as iron oxides will provide a light color to the coating without absorbing electron beam energy. When a cold laminating adhesive is employed, slightly higher concentrations of colorant may be added.

The present invention also includes a process for preparing the holographic shrink wrap element of the invention. For example, a process for preparing the first embodiment of the invention comprises providing, in the following order, a holographic polymer film having a holographic surface, a layer on the holographic surface and a shrink wrap film, and removing the holographic polymer film, leaving the holographic image on the layer.

A process for preparing the second embodiment of the invention comprises providing, in the following order, a holographic polymer film having a holographic surface, an adhesive on the holographic surface and a shrink wrap film, and removing the holographic polymer film, leaving the holographic image on the adhesive.

A process for preparing the third embodiment of the invention comprises providing, in the following order, a holographic polymer film having a holographic surface, an image intensifying layer on the holographic surface, an adhesive and a shrink wrap film, and removing the holographic polymer film, leaving the holographic image on the image intensifying layer. If desired, the third embodiment may further comprise providing the tie coat between the image intensifying layer and the adhesive.

A process for preparing the fourth embodiment of the invention comprises providing, in the following order, a holographic polymer film having a holographic surface, a release coating on the holographic surface, an adhesive and a shrink wrap film, and removing the holographic polymer film, leaving the holographic image on the release coating. If desired, the fourth embodiment may further comprise providing the image intensifying layer between the release coating and the adhesive or the tie coat between the release coating and the adhesive. Also, if desired, the fourth embodiment may further comprise providing both the image intensifying layer and the tie coat for example in the following order: holographic polymer film, release coating, image intensifying layer, tie coat, adhesive and shrink wrap film.

When an electron beam coating is used as the adhesive, the process of preparing the first, second, third and fourth embodiments of the invention comprises the additional step of curing the electron beam coating prior to removal of the holographic polymer film.

The holographic polymer film containing the holographic image is a commercially available polymer film which has not received surface treatment such as corona flame or chemical treatment on the holographic surface. Biaxially oriented polypropylene (BOPP) is the preferred film although any polymer material capable of being embossed may be used. Other examples include polyethylene terephthalate (PET), polyethylene naphthalate (PEN), nylon, and acetate.

The holographic polymer film may be made holographic either during manufacture (via extruding or casting the film onto a template bearing a holographic image as in U.S. Pat. No. 5,083,850) or post-extrusion using known embossing methods (for example, in U.S. Pat. No. 4,259,285). The depth of the embossing is generally within the range of 0.2–2.0 microns. BOPP film gauges are typically between 1.0–1.2 mil, preferably, 1.0 mil, allowing for re-use of the film.

Figure 3:
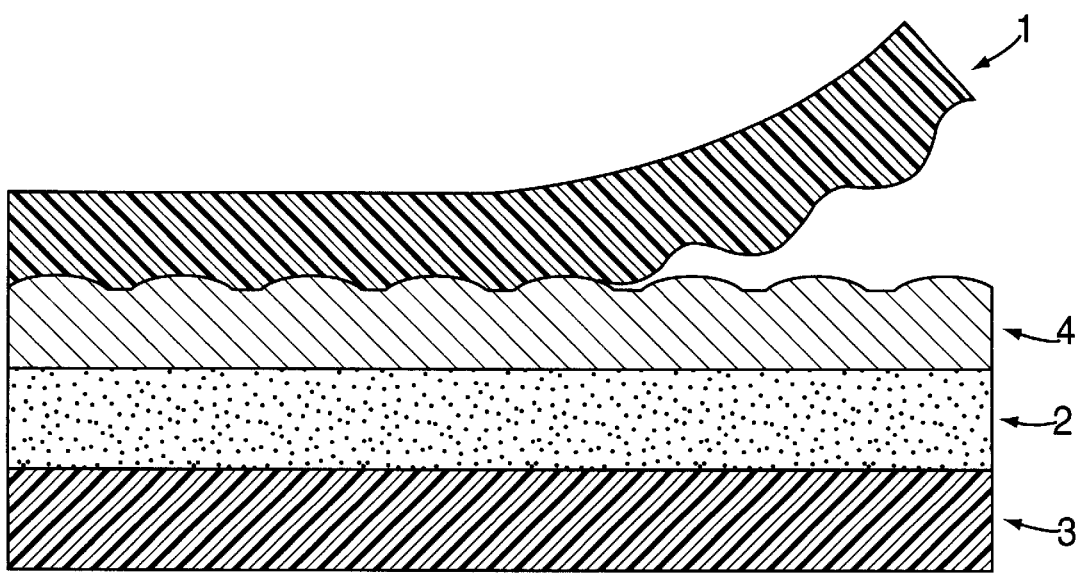
FIG. 3 is a cross sectional view of the holographic shrink wrap element of this invention containing a holographic polymer film 1/image intensifying layer 4/adhesive 2 (e.g., electron beam coating or cold laminating adhesive)/shrink wrap film 3, wherein the holographic polymer film 1 is being removed, leaving the holographic image on the surface of the image intensifying layer 4.
Figure 4:
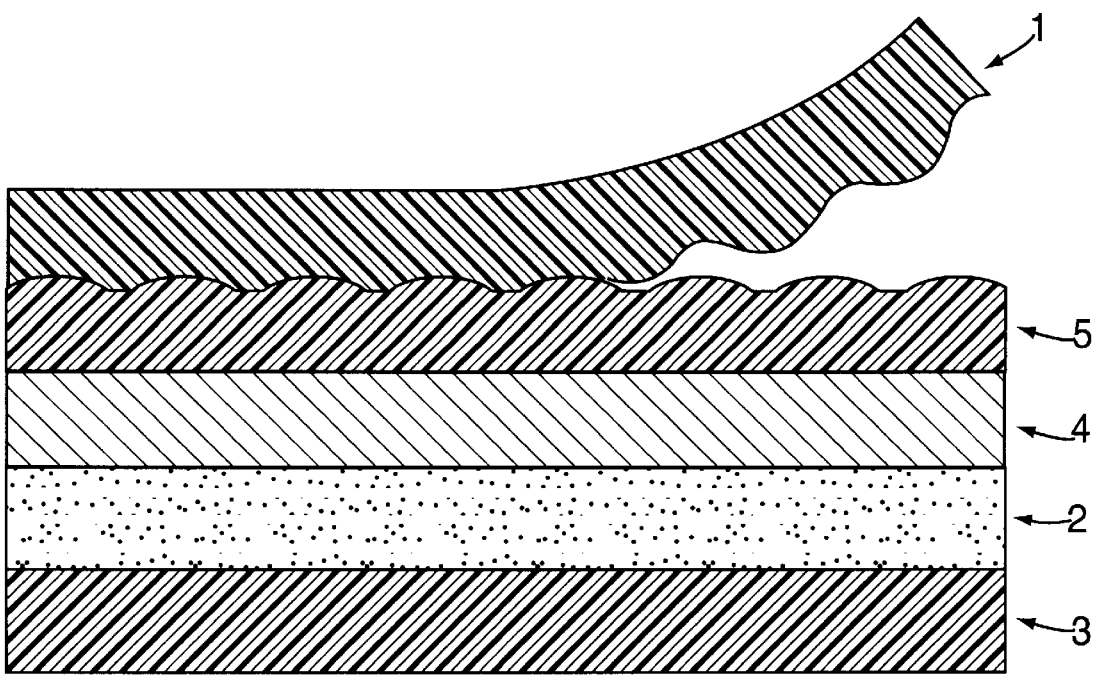
FIG. 4 is a cross sectional view of the holographic shrink wrap element of this invention containing a holographic polymer film 1/release coating 5/image intensifying layer 4/adhesive 2 (e.g., electron beam coating or cold laminating adhesive)/shrink wrap film 3, wherein the holograpic polymer film 1 is being removed, leaving the holographic image on the surface of the release coating.

FIGS. 3 and 4 specifically show examples of the third and fourth embodiments of the present invention, respectively, during stripping of the holographic polymer film. More specifically, as shown in FIG. 3, the holographic polymer film 1 is generally coated to a thickness of 200–400 angstroms with the image intensifying layer 4. The adhesive 2 and shrink wrap film 1 are subsequently provided thereon. In this embodiment, the holographic polymer film 1 is stripped from the image intensifying layer 4. The holographic image is now borne on the surface of the image intensifying layer 4. In addition to making the holographic image more pleasing, the image intensifying layer 4 may provide reflectivity or abrasion resistance to the element.

An example of the fourth embodiment of the invention is illustrated in FIG. 4. In a process for preparing the fourth embodiment, a release coating 5 is generally coated onto the holographic polymer film 1 to a coating weight of 30–40 mg/m$^2$. The release coating 5 assists in the stripping process and is used either with or without the image intensifying layer 4 and with an adhesive 2 (e.g., either an electron beam curable coating or cold laminating adhesive). In this exemplification, the release coating 5, carrying the holographic image, lies at the surface of the image intensifying layer. In addition to enhancing the stripping of the holographic polymer film, the release coating 5 imparts abrasion resistance and printability to the element. A minimum dyne level of 38 is generally attained.

Figure 5:
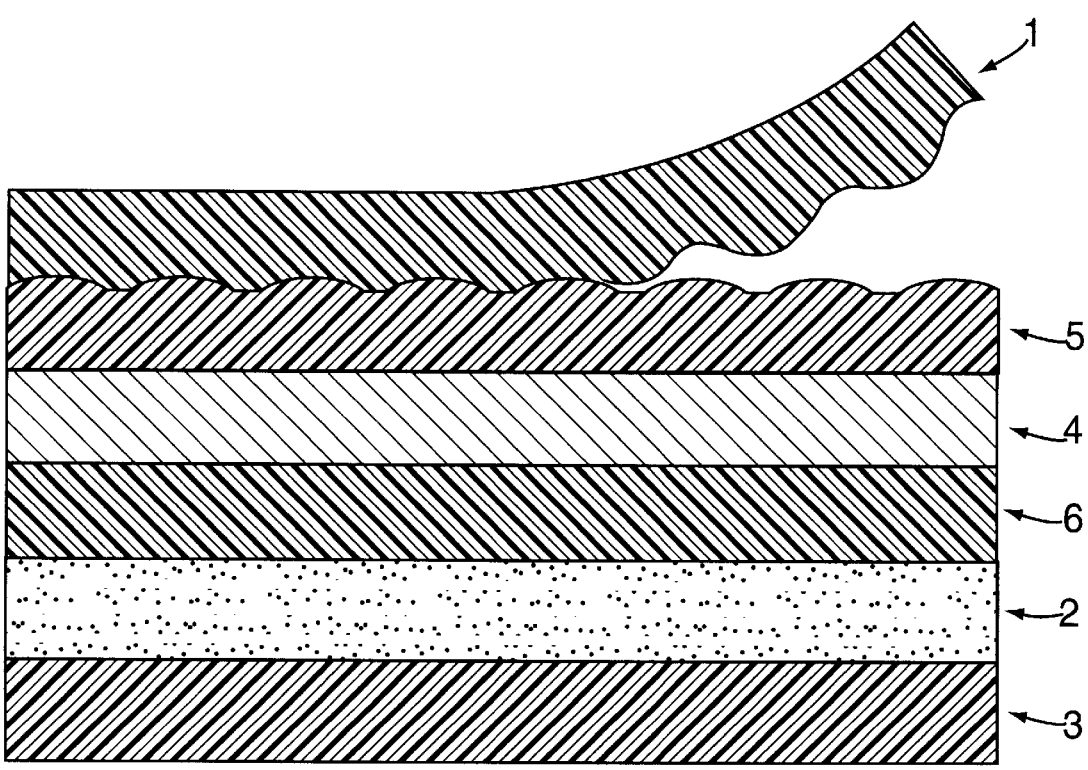
FIG. 5 is a cross sectional view of the holographic shrink wrap element of this invention containing a holographic polymer film 1/release coating 5/image intensifying layer 4/tie coat 6/adhesive 2 (e.g., electron beam coating or cold laminating adhesive)/shrink wrap film 3, wherein the holographic polymer film is being removed, leaving the holographic image on the surface of the release coating.

FIG. 5 depicts a further embodiment wherein a tie coat 6 is coated onto the image intensifying layer 4 to a coating weight of 30–40 mg/m$^2$ prior to lamination. The tie coat 6 preferably consists of a terpolymer containing vinyl chloride and vinyl acetate such as VMCH (Union Carbide), and, as noted above, is used in conjunction with an image intensifying layer, a release coating, or both. The tie coating improves intercoat adhesion between the adhesive 2 (e.g., electron beam curable coating or cold laminating adhesive) and either the image intensifying layer 4 or the release coating 5.

Figure 2:
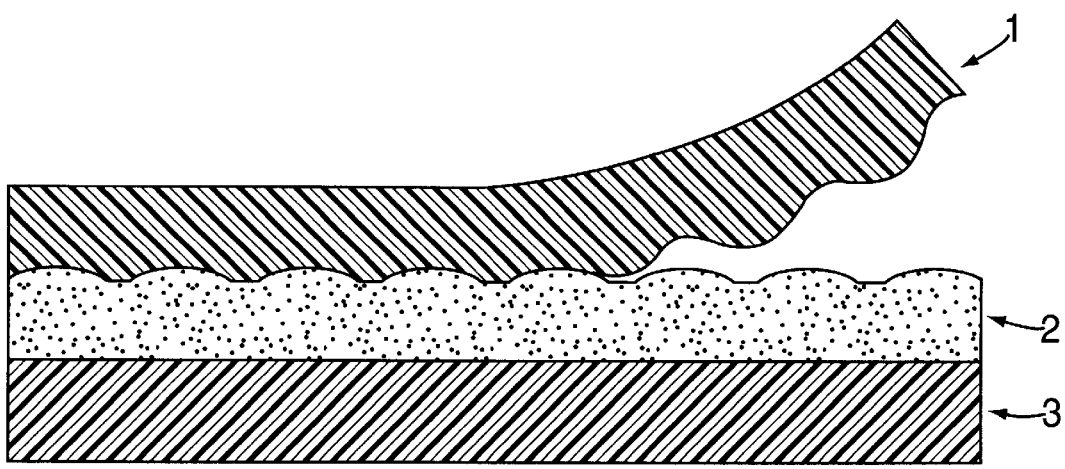
FIG. 2 is a cross sectional view of the holographic shrink wrap element of this invention containing a holographic polymer film 1/adhesive 2 (e.g., electron beam coating or cold laminating adhesive/shrink wrap film 3, wherein the holographic polymer film 1 is being removed, leaving the holographic image on the surface of the adhesive 2.
Figure 6:
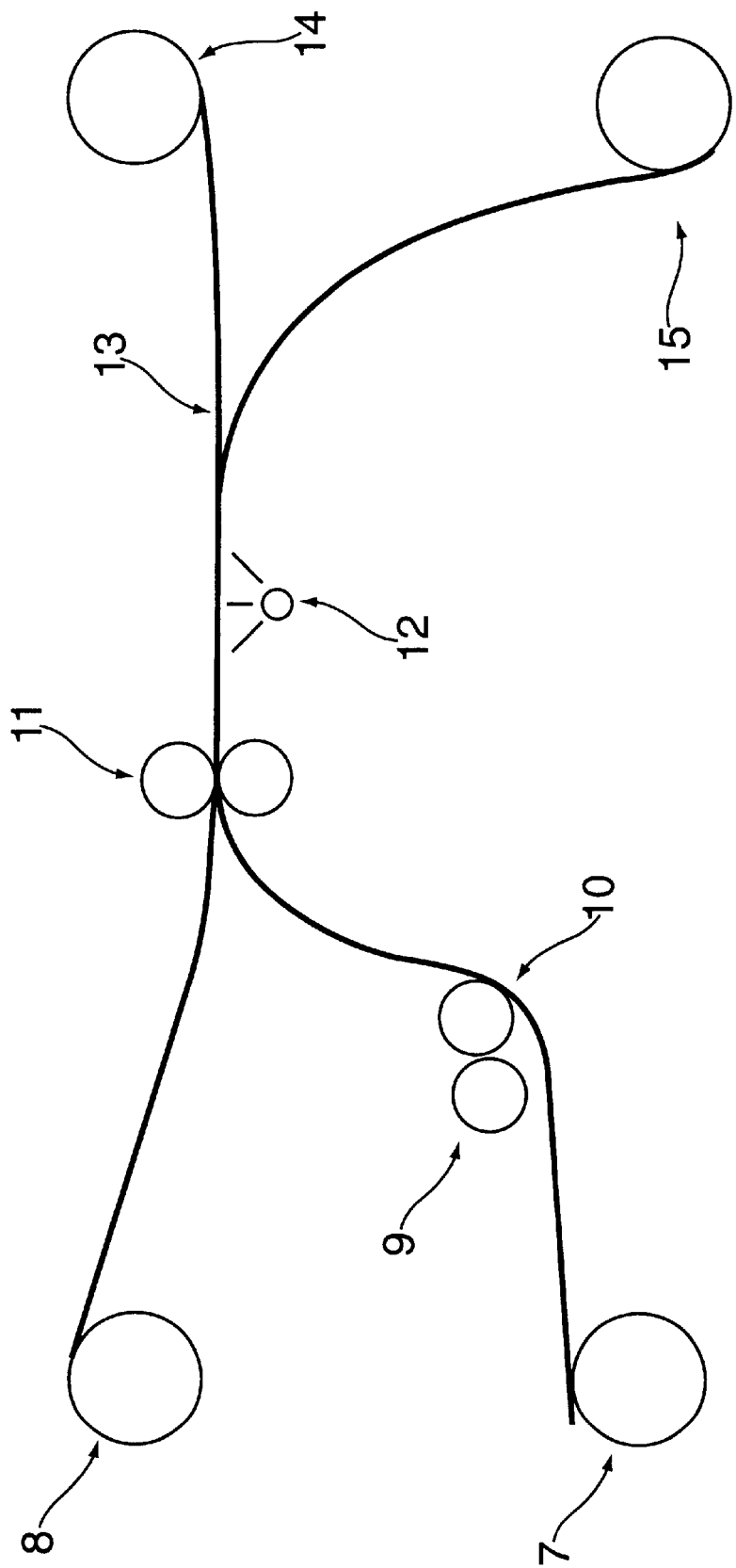
FIG. 6 is a schematic of an image transfer process which can be utilized in preparing the holographic shrink wrap element illustrated in FIG. 1 wherein the adhesive is an electron beam curable coating.

FIG. 6 displays a diagram of the process for preparing the second embodiment wherein an electron beam curable coating is the adhesive 2 from FIG. 1 and is coated across the entire holographic surface of the holographic polymer film 1 unwinding at station 7 to a coating weight of 4–5 grams/m$^2$, preferably, 5 grams/m$^2$. In FIG. 6, the coating method 9, 10 may be direct or indirect gravure, flexographic, or gap. Alternatively, the electron beam coating is applied selectively in the form of a pattern such as stripes, ovals or a company logo. Coating speed is typically in the 150–200 foot/minute range. Immediately after the coating has been applied, the shrink film unwinding from station 8 and the coated holographic polymer film are nipped together at a nip station 11, sandwiching the coating between the two films. The laminate structure is passed through an electron beam curing station 12 which hardens the coating. The holographic polymer film may be stripped away 13 prior or subsequent to the rewind stations, leaving a holographic shrink wrap element consisting of a shrink wrap film and the electron beam curable coating which now bears a holographic image thereon at station 14 and reusable holographic polymer film at station 15. FIG. 2 displays the transfer of the surface image from the holographic polymer film 1 to the surface of the cured electron beam curable coating 2 during the stripping process.

Figure 7:
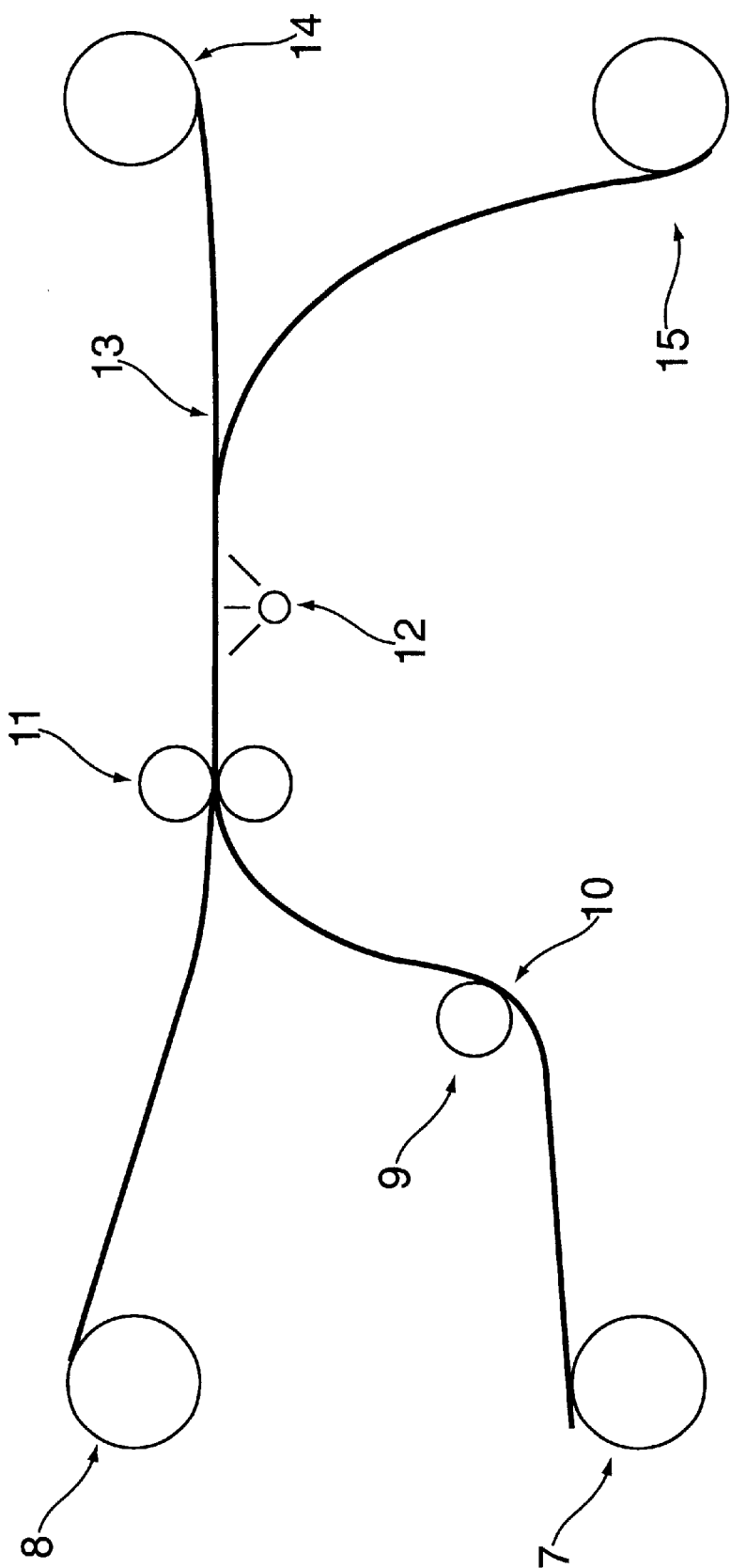
FIG. 7 is a schematic of another image transfer process which can be utilized in preparing the holographic shrink wrap element of this invention.

FIG. 7 is a schematic of the process which may be utilized in preparing a holographic shrink wrap element of the invention and is similar to FIG. 6 except a cold laminating adhesive is substituted for the electron beam curable coating. The numbered items indicated in FIG. 7 are the same as in FIG. 6, except the electron beam curing station 12 is not needed.

The present invention will further be explained in the following examples. However, the present invention should not be construed as being so limited. Unless otherwise indicated, all parts, percentages and the like are by weight.

EXAMPLE 1

Referring to FIG. 6, a holographic BOPP film, 30 microns thick and coated with a 300 angstrom thick layer of vacuum vapor deposited aluminum, was loaded onto one unwind station 7 of a homebuilt dual unwind/rewind coater/laminator. On the second unwind station 8 was loaded a 20 microns thick roll of shrink wrap film 3 (UCB GLS grade) with a 15% shrinkage value. The BOPP film was passed through an offset gravure coating station 9, 10 where an acrylate containing electron beam curable coating from Sun Chemical was applied across the entire surface of the BOPP film via a 150? engraved gravure cylinder to a coating weight of 5 g/m$^2$. The shrink wrap film and the coated BOPP were passed through a nip 11 such that the aluminum side of the BOPP contacted the shrink wrap film. This laminate then passed through an electron beam curing station 12 at 150 feet/minute with the electron beam passing through the BOPP. After the curing step, the BOPP was stripped at 13 from the element and was rewound at 15. The BOPP was then re-metallized for a subsequent run. The holographic shrink wrap element, comprising the shrink wrap film, the hardened electron beam curable coating, and the aluminum image intensifying layer bearing the holographic image, was rewound separately at 14.

EXAMPLE 2

Again referencing FIG. 6, holographically embossed BOPP film, 30 microns thick, was loaded onto one unwind station 7 of a dual unwind/rewind homebuilt coater laminator. On the second station 8 was loaded 20 microns thick UCB GLS grade shrink wrap film. The shrink wrap film was passed through an offset gravure coating station 9, 10 where an acrylate-containing electron beam curable-coating from QURETECH® was applied. The application medium was a gravure cylinder engraved with a 150 line screening in the form of stripes, thus coating the electron beam curable coating in a stripe pattern onto the holographic surface of the shrink wrap film. The coated shrink wrap film and the BOPP were passed through a nip 11 such that the coated surface of the shrink wrap film was contacting the BOPP. This laminate then passed through an electron beam curing station 12 at 150 feet/minute with the electron beam passing through the BOPP. The entire construction was rewound onto one roll at station 15 and was subsequently stripped to yield reusable BOPP film and a holographic shrink wrap element comprising the shrink wrap film and an electron beam cured coating bearing a holographic image and oriented in a stripe pattern across the film.

What is claimed is:

1. A holographic shrink wrap element consisting of, in the following order, a shrink wrap film, an adhesive and an image intensifying layer, wherein said image intensifying layer contains a holographic image.

2. The holographic shrink wrap element of claim 1, wherein said image intensifying layer is at least one member selected from the group consisting of vacuum vapor deposited aluminum, silicon monoxide, silicon dioxide, aluminum oxide, magnesium fluoride, zinc sulfide, titanium dioxide, tin tungsten oxide and indium tin oxide.

3. A holographic shrink wrap element consisting of, in the following order, a shrink wrap film, an adhesive and an image intensifying layer, a tie coat between said image intensifying layer and said adhesive, wherein said image intensifying layer contains a holographic image.

4. The holographic shrink wrap element of claim 3, wherein said tie coat comprises a vinyl chloride/vinyl acetate terpolymer.

5. The holographic shrink wrap element of claim 1 or 3, wherein said adhesive is selected from the group consisting of an electron beam curable coating and a cold laminating adhesive.

\* \* \* \* \*